United States Patent [19]
Prinz et al.

[11] Patent Number: 5,286,573
[45] Date of Patent: Feb. 15, 1994

[54] METHOD AND SUPPORT STRUCTURES FOR CREATION OF OBJECTS BY LAYER DEPOSITION

[76] Inventors: Fritz Prinz, 6558 Darlington Rd.; Lee Weiss, 5801 Northumberland St., both of Pittsburgh, Pa. 15217

[21] Appl. No.: 946,969

[22] Filed: Sep. 17, 1992

Related U.S. Application Data

[63] Continuation-in-part of Ser. No. 829,767, Jan. 31, 1992, which is a continuation-in-part of Ser. No. 620,745, Dec. 3, 1990, Pat. No. 5,126,529.

[51] Int. Cl.$^5$ ................................................. B32B 9/00
[52] U.S. Cl. ..................................... 428/457; 428/419; 428/469; 428/913.3; 427/229
[58] Field of Search ............ 428/457, 419, 469, 913.3; 427/229

[56] References Cited

U.S. PATENT DOCUMENTS

| | | | |
|---|---|---|---|
| 4,289,829 | 9/1981 | Rossetti | 428/409 |
| 4,376,814 | 3/1983 | Walls | 430/272 |
| 4,665,492 | 5/1987 | Masters | 364/468 |
| 4,752,352 | 6/1988 | Feygin | 150/630 |
| 4,775,092 | 10/1988 | Edmonds | 228/222 |
| 4,842,186 | 6/1989 | Doyle et al. | 228/222 |
| 4,894,505 | 1/1990 | Malone et al. | 219/76.1 |
| 5,110,675 | 5/1992 | Newkirk | 428/312.2 |

FOREIGN PATENT DOCUMENTS 0322257 6/1989 United Kingdom ................ 39/42

OTHER PUBLICATIONS

Microwave Materials and Devices, J. K. Dillion, Jr., Chairman, "Polycrystalline Ferrite Films for Microwave Applications Deposited by Arc-Plasma" by D. H. Harris, R. J. Janowiecki, C. E. Semler, M. C. Willson and J. T. Cheng, published in the Journal of Applied Physics, vol. 41, No. 2, Mar. 1, 1970.
"Three Dimensional Printing: Ceramic Tooling and Parts Directly from a CAD Model" by Emanuel E. Sachs, Michael Cima, James Cornie, David Brancazio and Alan Curodeau submitted to the National Rapid Prototyping Conference, Dayton, Ohio, Jun. 4–5, 1990.
"Automated Fabrication of Net Shape Microcrystalline and Composite Metal Structures Without Molds" by David Fauber, pp. 461–462, published in the Manufacturing Processes, Systems and Machines, 14th Conference on Production, Research and Technology, National Science Foundation, Ann Arbor, Michigan, Oct. 6–9, 1987.
"A Rapid Tool Manufacturing System Based on Stereolithography and Thermal Spraying" by Lee E. Weiss, E. Levent Gursoz, F. B. Prinz, Paul S. Fussell, Swami Mahalingham and E. P. Patrick, published by the American Society of Mechanical Engineers, 1990, pp. 40–48.
"DC Arc Plasma-The Future in The P/M Industry?" by Douglas H. Harris published by ASP-Materials, Inc., Dayton, Ohio.

*Primary Examiner*—Patrick J. Ryan
*Assistant Examiner*—Abraham Bahta
*Attorney, Agent, or Firm*—Buchanan Intersoll; Lynn J. Alstadt

[57] ABSTRACT

An improved support structure is provided in a method for making objects by the incremental build-up of layers of a deposition material and adjacent support material. The improved support structure includes a first material and a second material placed as a coating upon the first material. The deposition material, first material and second material each preferably have a selected melting point such that the first material melting point is lower than the deposition material melting point and such that the second material melting point is greater than the first material melting point.

11 Claims, 5 Drawing Sheets

METHOD AND SUPPORT STRUCTURES FOR CREATION OF OBJECTS BY LAYER DEPOSITION

RELATED APPLICATION

This application is a continuation-in-part of application Ser. No. 829,767, filed Jan. 31, 1992, which is a continuation-in-part of application Ser. No. 620,745, filed Dec. 3, 1990, now U.S. Pat. No. 5,126,529.

FIELD OF INVENTION

The invention relates generally to the creation of three-dimensional objects by the deposition of layers of material and more particularly to support structures and the method of making the same used in the deposition process.

BACKGROUND OF THE INVENTION

Several methods have been proposed and utilized for creating three-dimensional objects by the incremental material build up of thin layers. These processes include lamination, selective laser sintering, ballistic powder metallurgy, three-dimensional printing, stereolithography and near net thermal spraying. Lamination involves the simple process of cutting layers of a selected material and then bonding those layers together. The layers may be pre-cut to shapes corresponding to a cross section through the article to be created. Alternatively, standard shapes of material can be stacked and bonded together. Then, the assembled structure is cut or machined to produce the desired shape. In U.S. Pat. No. 4,752,352, Michael Feygin proposes a computer controlled method and apparatus for forming a laminated object. He provides a supply station, a work station for forming a material into a plurality of layers for lamination, an assembly station for stacking the layers in sequence into a three-dimensional object, a station for bonding the laminations to complete the formation of the three-dimensional object and a control station. In his patent, Mr. Feygin discloses a method in which the laminations are cut from a roll of material lifted, stacked and bonded under the direction of a computerized controller. The layers are bonded together by adhesive or brazing. This and other lamination techniques have several disadvantages. First, the bond between layers is critical and limits the strength of the object. Second, creation of each layer of the laminate also results in the production of significant amounts of waste materials. Third, the resulting object has a layered or serrated edge which must be removed by sanding or grinding. Finally, lamination is suitable for only those materials which can be formed into thin layers which can be bonded together.

In laser sintering, a laser is used to cure a starting material into a certain configuration according to the manner in which the laser is applied to that material. Stereolithography is a more recent yet similar process which creates plastic prototype models directly from a vat of liquid photocurable polymer by selectively solidifying it with a scanning laser beam. An example of this method is described in European Patent 322 257. Both of these methods require a substantial amount of curable raw material. In both cases the laser must be carefully controlled to achieve the desired shape. In some applications, the laser typically does not fully cure each cross section. Rather, the laser cures the boundary of a section and then cures an internal structure or honeycomb that traps the uncured fluid. Thereafter, the article must be subjected to final curing under separate ultraviolet lights or heat treatment. Additional post processing, such as careful sanding and grinding, is required for making smooth, accurate surfaces.

In ballistic powder metallurgy beams of particles are directed to the coordinates of a three-dimensional object in a three-dimensional coordinate system. A physical origination seed to which the particulate matter is attracted is required. The process may use a beam of particles directed to the origination seed which builds the particles upward from that seed. Alternatively, one can use an energy beam which attracts the particulate matter already in the environment to the seed or another coordinate. Such a system is disclosed by William E. Masters in U.S. Pat. No. 4,665,492. This method cannot be used to make objects having undercuts therein without creating support structures at the same time. Normally, the support structures are created with the particle beam during the creation of the object. Such support structures must be removed by cutting, grinding, machining or melting.

Three-dimensional printing is another technique similar to ballistic powder metallurgy. One variation of this technique creates layers of particles to produce a three-dimensional image in much the same manner that an ink jet printer produces two-dimensional images. The technique relies upon thermal shock or drop on demand material delivery techniques. A thermal shock technique forms a particle by vaporizing a small area of the fluid directly behind the nozzle. The drop on demand nozzle includes a piezo electric element to constrict the cavity thereby forcing a drop past the nozzle plate. In both instances the material is directed to a work surface in a manner to build up the article. This technique can only be used for certain kinds of materials.

In another variation of three-dimensional printing a series of two-dimensional layers are created by adding a layer of powder on top of a work surface. The powdered layer is selectively joined where the part is be formed by ink jet printing of a binder material. The work surface is then lowered and another layer of powder is spread out and selectively joined. The layering process is repeated until the part is completely printed. Following a heat treatment the unbonded powder is removed leaving the fabricated part. Although this technique has been proposed for metal, ceramic and plastic materials, it is limited to those materials to which a reliable binder can be applied.

None of the just described fabrication techniques have been successfully used to make parts of a variety of materials. For example, the art has attempted to make objects by spraying layers of metal on a substrate. Problems have occurred in that the layers have tended to camber and possibly to peel apart from the substrate. Therefore, one must have a release agent or compatible substrate. Also, the incremental buildup techniques of fabrication known in the art typically produce stepped surfaces when an angled profile is desired. The stepped surfaces require increased post-manufacturing grinding and polishing.

There is a need for a method to manufacture quality parts of a variety of materials by incremental build-up of the chosen material. The method should be capable of producing articles having undercuts and irregular shapes.

BRIEF DESCRIPTION OF THE INVENTION

We provide a support structure for use in the creation of three-dimensional objects by the deposition of layers of material. In the deposition process, each layer is composed of two portions. A first portion represents a cross-sectional slice of a three-dimensional object being built and is composed of the desired deposition material. The second portion is the complement of the object shape of the first portion and serves as a support structure which supports the growing object form. The deposition material and support structure material are each applied in a predetermined sequence so that a plurality of layers, each placed upon the previous layer, are formed. In this way, a layered structure is built up which contains the object made of the deposition material surrounded by the complementary material.

The deposition material is applied by any means but the preferred means is by weld deposition. Similarly, the support structure material may be applied by any means but the preferred method is by dripping or thermal spraying.

For each layer, both of, one of or neither of the complementary material and the deposition material can be shaped as needed to produce the desired object. Preferably, the shaping occurs after material is applied and before the subsequent layer is applied. The preferred support structure should be capable of having a substantial portion thereof removed after the object has been fabricated. Clearly, the melting process for removal of the support structure material should not involve a temperature that will melt the fabricated object so as to distort the shape of the object. Thus, the support structure would preferably have a melting point lower than the melting point of the deposition material. However, the deposition material is often applied at a sufficient temperature relative to the melting point of the support structure material so as to melt the support structure. Therefore, the preferred support structure should be able to withstand contact with the deposition material without melting.

The preferred support structure is comprised of two materials—a first material and a coating of second material placed on the first material. The first material has a melting point lower than the melting point of the deposition material. The coating of second material is then placed upon the first material. The second material has a melting point greater than the melting point of the deposition material.

One could also use a ceramic for the first material and a metal for the coating. A portion of the coating adjacent the object may be machined away before the next layer of ceramic is applied thereon. After the object is completed, the ceramic support material may be broken away.

During the application of each layer, the support structure is able to withstand the elevated temperatures and relatively high heat content of the applied deposition material. However, after application of the final layer, much of the support structure is able to be removed by being melted away leaving the created object. Alternatively, the entire support structure may be machined or broken away.

Other objects and advantages of the invention will become apparent in connection with the description of the preferred embodiments shown in the following figures.

DESCRIPTION OF THE PREFERRED EMBODIMENTS

Figure 1:
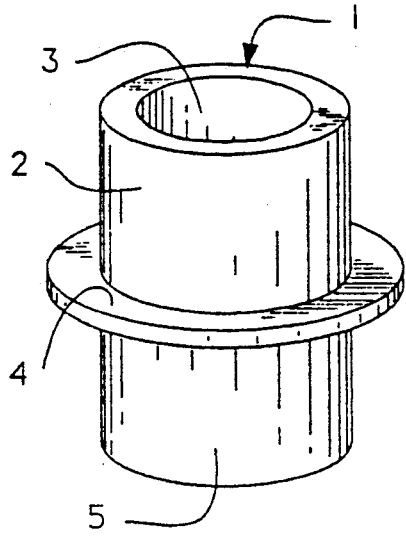
FIG. 1 is a perspective view of an article to be created.

In FIG. 1 we show an article 1 which can be manufactured in accordance with our method. Article 1 is comprised of an upper tubular portion 2 and lower tubular portion 5 separated by collar 4. Article 1 is hollow as indicated by passageway 3, and is made of any appropriate material. The material of which article 1 is fabricated is hereinafter referred to as the deposition material. The material that surrounds and supports article 1 during fabrication is hereinafter referred to as the support structure material. In the present invention, any means of delivering the deposition material and the support structure material is acceptable. The present method also employs two sets of masks and a shaping means. A first set of masks is defined that contains at least one mask corresponding to each cross section through an article such that there is at least one mask in every set for every parallel cross section normal to a center line through the article. A second set of masks is defined that contains at least one mask corresponding to each mask from the first set of masks and defines a complement to the cross section defined by that corresponding mask.

Figure 2:
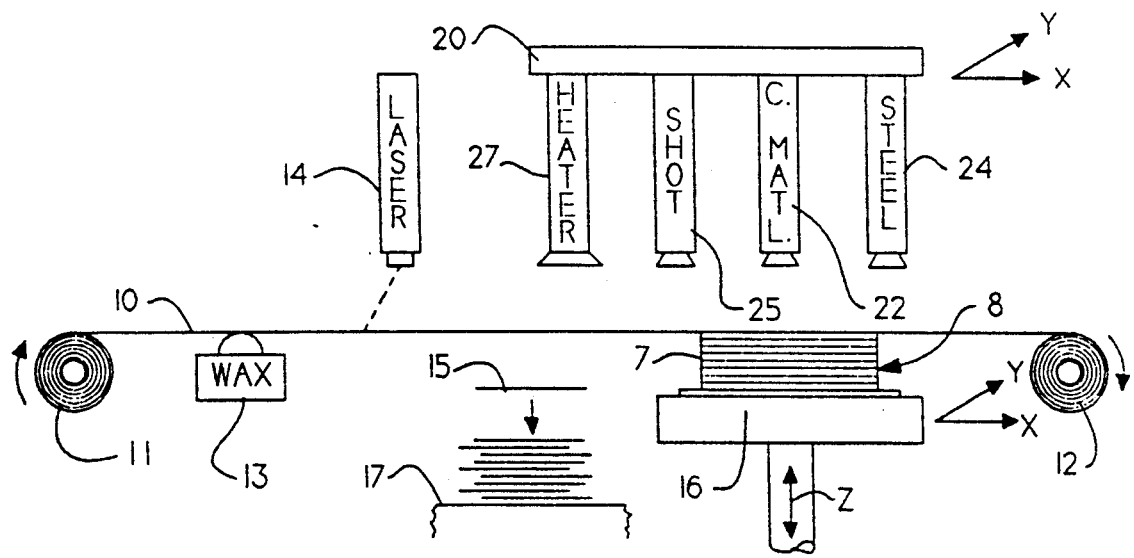
FIG. 2 is a diagram showing an apparatus that performs the present a method of making three-dimensional objects such as the article shown in FIG. 1.

Referring to FIG. 2, the masks are positioned over a work table 16. Work table 16 preferably is capable of moving in three directions as indicated by arrows x, y and z. A sequence of masks are moved over the table and when a set of masks reaches a desired position above table 16, head 20 is moved in a manner to direct the delivery of deposition material from delivery means 24 or support structure material ("C. MATL.") from delivery means 22. In this way, a layer 7 is formed with a portion of the layer consisting of deposition material 10 and the remaining portion of each layer consisting of support structure material. In one embodiment, the support structure material is applied first. Therefore, a set of masks corresponding to the support structure material is positioned above table 16 and the support structure material is sprayed. This set of masks is then removed. After the support structure material has been applied, a shaping means (not shown in FIG. 2) such as a grinding, milling or other shaping tool shapes the support structure material as needed to its final shape. The next set of masks corresponding to the deposition material is positioned and the deposition material is applied. The deposition material is then shaped as needed. Although we prefer to move the delivery means during deposition, one could also use fixed delivery means and move the work surface 16. In the apparatus of FIG. 2, the work surface 16 would be moved out from under mask material 10 to permit shaping of the deposited material. After each layer is completed, work table 16 is dropped to allow for application of the next layer. The process is then repeated for each layer until the final block of material is produced.

Figure 3:
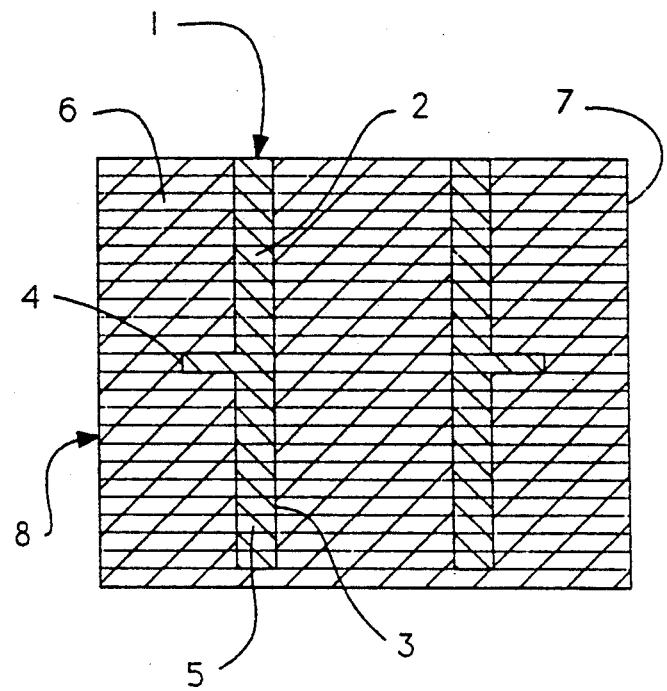
FIG. 3 is a cross sectional view of the block of sprayed material for making the article shown in FIG. 1.

Upon completion of the process, one will have a block of material 8, a cross section of which is shown in FIG. 3. Because we have deposited a support structure material 6 with the deposition material, we are able to create intricate shapes and parts having undercut portions. For the particular object of FIG. 1, the support structure material 6 supports the deposited collar material 4. The support structure material must be removed from the block of material. We prefer that at least a portion of the support structure be comprised of a material having a melting point lower than the melting point of the deposition material. If that occurs the block 8 of material shown in FIG. 3 can be heated to a temperature so that support structure material 6 can be heated and melted away from the object 1. We have found that if the article is to be fabricated in steel or zinc, a metal alloy or polymer having a melting temperature between approximately 150° to 340° F. makes a suitable support structure material. Such alloys are manufactured by Cerro Metal Products Company of Belafonte, Pa., and sold under the trademark of Cerro.

Although the masks used for our technique could be produced separately by any means, we prefer to use a single apparatus, shown in FIG. 2, for producing the masks and spraying the layers. Generally, we provide a masking material 10 in roll form on roller 11 which passes to take-up roll 12. At station 13, wax of an adhesive material can be applied to the under surface of the masking material or one could use pressure sensitive paper. This material may be a metal foil paper, reinforced paper or other suitable material. We have found that paper can be used as a masking material for making an object of stainless steel utilizing a low melting point alloy as the support structure material. The masking material passes under a laser 14 and a mask is cut by the laser. The cut away portion 15 of the masking material 10 drops from the moving mask material onto a surface 17 for disposal. Fiducial markers 9 may also be cut out to provide for precise alignment of the mask 10 over the substrate. The substrate is seated on a set of servo controlled x-y-z (and perhaps rotary) stages. The x-y stages may be integrated with an optical sensing system, which detects the fiducial markers, to precisely align the mask over the substrate. The z-stage drops the substrate by the thickness of each layer, between consecutive layers. The masking material may be of any appropriate material such as paper, plastic, or metal. If a metal or plastic is used, then the delivery means for applying the materials may cause sections of the mask to move around. Therefore, a "sticky" surface may have to be applied to the backside of the roll, for example by wax station 13, to hold the mask in place against the substrate. Alternatively, one could use pressure sensitive paper for the masks.

The art has observed in some material deposition processes that residual stress develops in the applied metal layer causing the layer to camber and possible to peel. To relieve the stress the art has shot peened such layers. The technique is only successful in situations where shot is evenly applied over the layer. Since our layers are flat, we can use this technique. Therefore, we prefer to provide a shot peener 25 for shot peening each layer.

It is also possible to relieve the stress by induction heating. Therefore, we alternatively provide an induction heater 27 which we move over each layer to selectively heat the surface. Such heating is easier to accomplish on flat layers rather than on curved and irregular surfaces.

Figure 4:
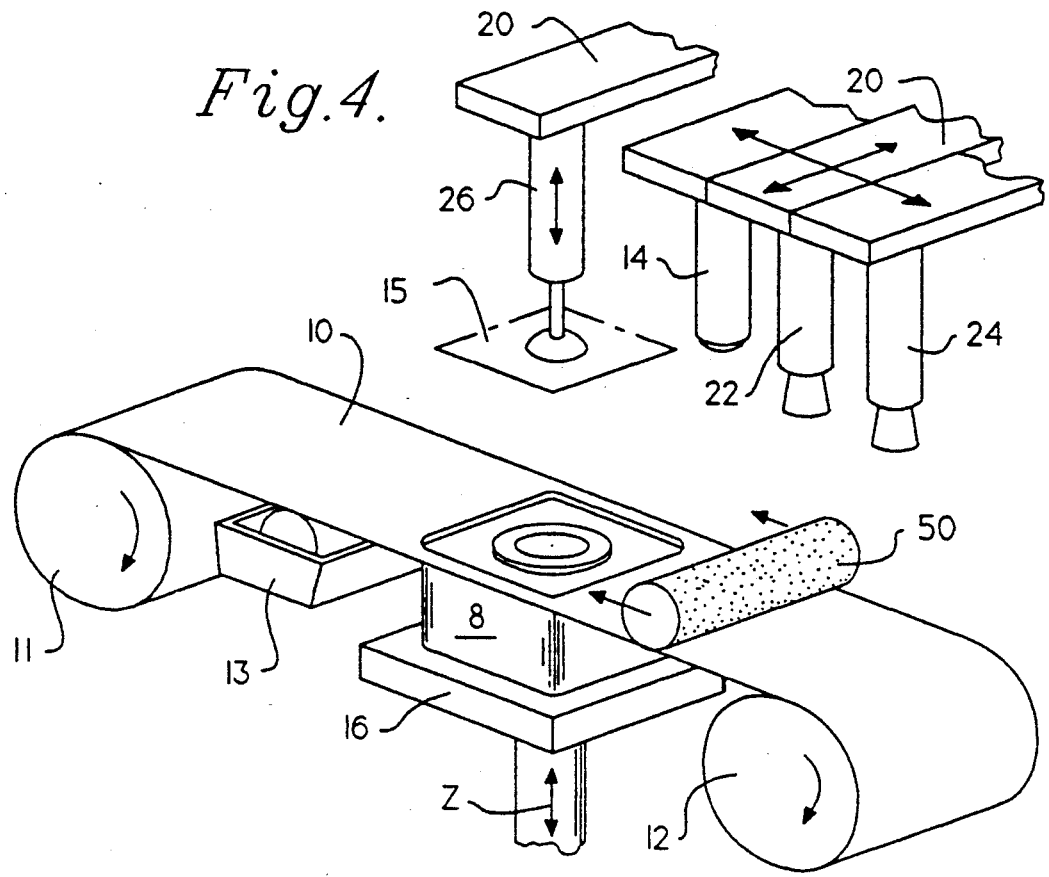
FIG. 4 is a diagram of a second embodiment of the apparatus for making three-dimensional objects.
Figure 5:
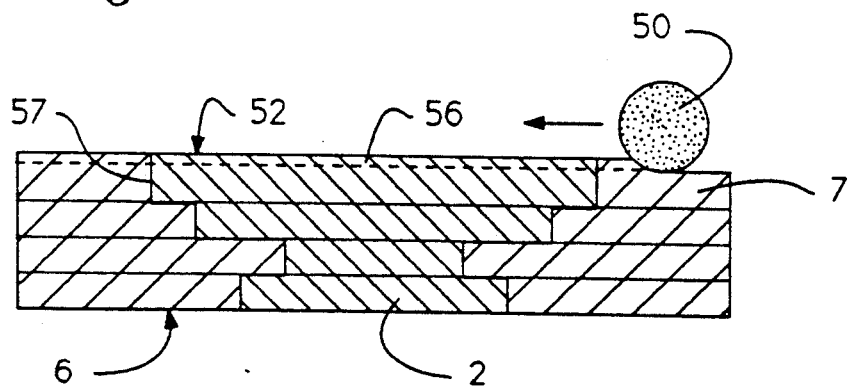
FIG. 5 is a sectional view showing grinding of the block produced with the apparatus of FIG. 4.

An alternative embodiment shown in FIGS. 4 and 5 alleviates the problem of masking inaccuracies and reduces the need for post-production finishing by incorporating a milling or grinding tool 50 to "face" each layer 7 to the exact thickness after each layer is deposited. In this embodiment, only a deposition material mask is required. First the mask for the deposition material is positioned over work table 16. The deposition material is applied and the mask is then removed. The applied deposition material is shaped as necessary. Then the support structure material is applied directly over that entire layer, without using a mask, filling in the region adjacent to the just applied deposition material as well as covering the top 52 of deposition material. A milling head or a grinding wheel 50 (or a combination of these) then passes over that layer removing the excess support structure material 56 which covers the deposition material and trimming that layer 57 to the exact thickness. The resulting milled surface should be sufficiently rough to assure bonding of the next layer to be deposited thereon. The process is then repeated for each layer until the final block of material is produced. Then the support structure material 6 is removed and the article is polished or otherwise processed as required.

Another alternative embodiment also incorporates a milling or grinding tool to "face" each application of deposition material. In this embodiment, only a support structure material mask is required. First, the mask for the support structure material is positioned over a work table. The support structure material is applied and the mask is then removed. The support structure material is then shaped to the desired contours. The deposition material is then applied over the entire layer without using a mask, filling in the region adjacent to the deposition material in the previous layer as well as covering the top of the just applied support structure material. A grinding wheel removed the excess deposition material and trims each layer to the exact thickness. The process is then repeated for each layer until the final block of material is produced. Then, the support structure material is removed.

In an alternative embodiment, the support structure material is applied first and is applied using no masks. Then a shaping means passes over the support structure material, shaping and contouring the support structure material surface so that the support structure material surface defines the surface of the object being produced for that layer. The deposition material masks are then positioned over the support structure material and the deposition material is applied. The deposition material is then shaped as desired. This process is repeated for each layer until the final block of material is produced. Then, the support structure material is removed. Conversely, one could first apply and shape the deposition material mask and apply the support structure material over the mask. Furthermore, a combination of these techniques could be used. That is, shape and mask the support structure material for selected layers, but shape and mask the deposition material in other layers.

In yet another embodiment, no masks are required. First, a layer of support structure material is applied using no masks. Then a shaping means passes over the support structure material, shaping and contouring the support structure material surface so that the surface of the support structure material defines the surface of the object being produced for that layer. The deposition material is then applied. The deposition material is then shaped as desired. This process is repeated for each layer until the final block of material is produced. Then the support structure material is removed. The converse method of first depositing and shaping the deposition material could also be used.

Figure 6:
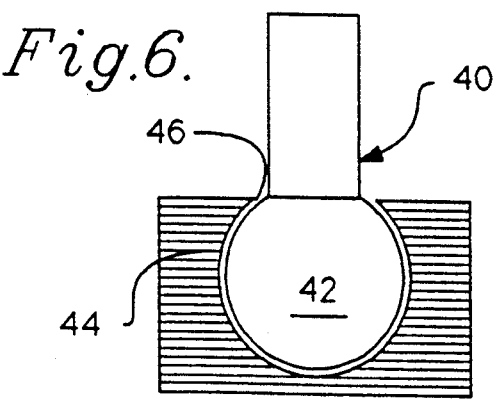
FIG. 6 is a cross section of a ball joint which can be made in accordance with the present invention.

The solid-freedom fabrication system disclosed here would also permit the fabrication of complete functional assemblies containing two or more mating parts in one process without the requirement of discrete assembly operations. In FIG. 6 we show a ball joint 40 having a ball head 42 in a socket 44 separated by space 46. This part can be made such that ball head 42 is one material and socket 44 is a second material. During fabrication a support structure material is deposited to fill space 46 and surround head 42 and socket 44. For example, the socket 44 may be steel, the ball head 42 a composite, and the support structure material can be Cerro metal. Upon application of the materials, the workpiece is heated to melt away the Cerro metal, leaving the assembly shown in FIG. 6. Variations of the preferred embodiment can be employed. For example, although several preferred means of producing the masks are disclosed, any means of producing the masks could be employed.

Any suitable means of delivering the deposition material and support structure material such as weld deposition, thermal spray deposition, liquid slurry, a gravity feed device or a manual device such as a hand sifter may be used. Also, although we show the delivery means 22, 24 and 25 on a single mounting head 20 in the apparatus of FIG. 2. It should be understood that separate mounting heads could be provided for each delivery means or for selected combinations of delivery means.

The preferred support structure is comprised of two materials—a first material and a coating of second material placed on the first material. The first material may be any suitable material, such as ceramic, plastic, composite and preferably metal or metal alloy such as tin-zinc or tin-bismuth. The second material may also be any suitable material such as ceramic, plastic, metal, metal alloy and preferably the same material as the deposition material.

A first preferred embodiment of the support structure is capable of having a substantial portion thereof removed by melting after the object has been fabricated. Clearly, the melting process for removal of the support structure material should involve a temperature that will not melt the fabricated object so as to distort the shape of the object. Thus, the support structure would preferably have a melting point lower than the melting point of the deposition material. However, the deposition material is often applied at a sufficient temperature relative to the melting point of the support structure material so as to melt the support structure if any of the deposition material are deposited thereon. Therefore, the preferred support structure should be able to withstand contact with the deposition material without appreciable melting. In this embodiment, the support structure first material has a melting point lower than the melting point of the deposition material. The support structure second material has a melting point greater than or approximately equal to the melting point of the deposition material. Thus, the support structure second material does not melt appreciably when the deposition material is placed upon it in the fabrication process. The support structure second material may be machined away after each layer is deposited, leaving a final block of layers consisting of deposition material and support structure first material. The entire support structure may then be removed by melting away the support structure first material.

A second preferred embodiment of the support structure is capable of having a substantial portion thereof machined away after the object has been fabricated. In this embodiment, the first material which may be any material and preferably a ceramic, is applied. A coating of second material is then placed on the first material. When the deposition material is a metal or metal alloy and is applied by welding, some heat transfer is necessary which is unavailable through the ceramic. Thus, in this embodiment, the coating of second material provides the heat transfer that is needed. When this combination of support materials is used, we prefer to keep both support materials in place until the object is completely formed. Hence, a block of layers consisting of deposition material, support structure first material and support structure second material is created.

Figure 7:
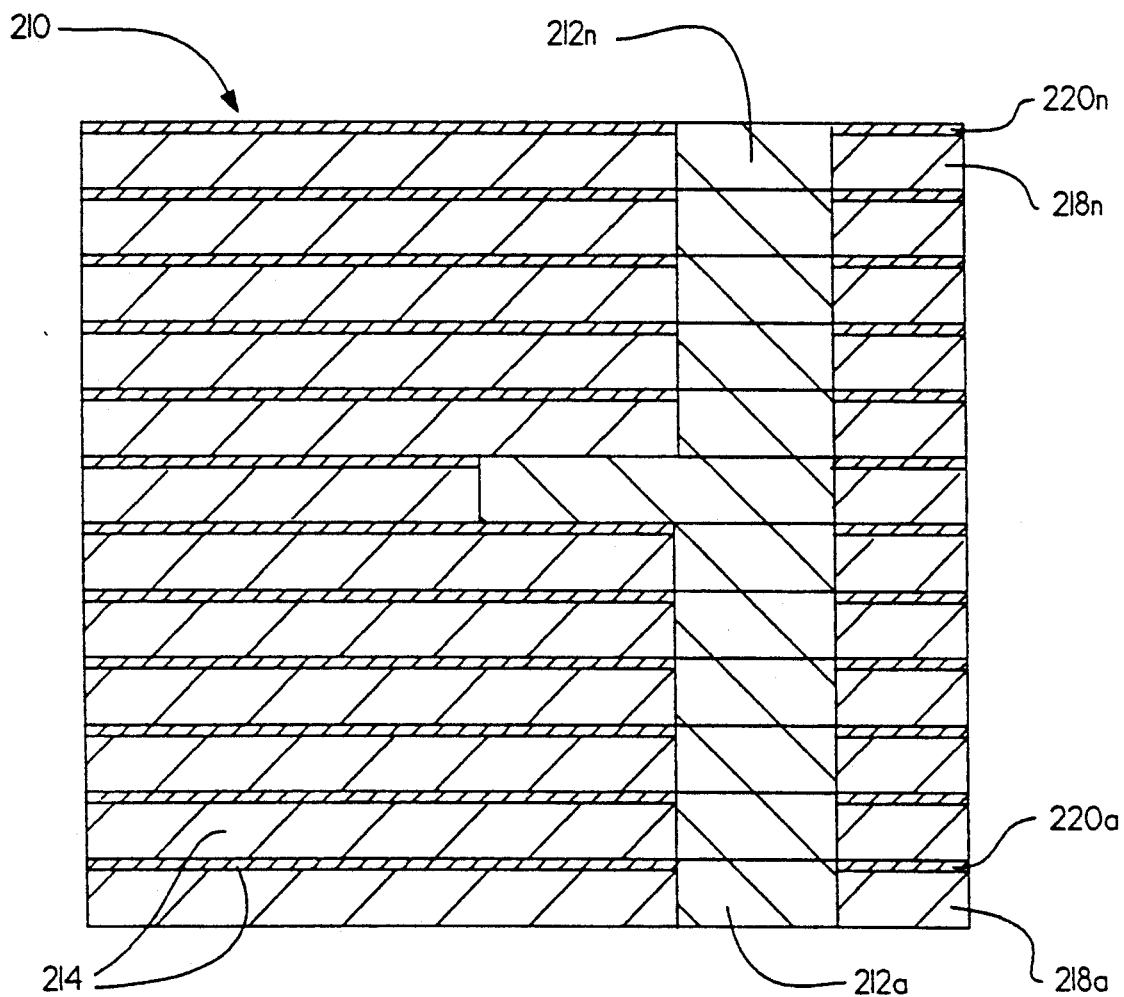
FIG. 7 is a cross-sectional elevational view similar to FIG. 3 of a block of material made with a present preferred support structure.

Referring to FIG. 7, a block 210 of materials is shown consisting of n layers 214 of deposition material 212 through 212n and support structure comprised of first material portions 218a through 218n and second material portions 220a through 220n. The deposition material consists of any appropriate material such as ceramic, plastic, composite and preferably metal or metal alloy. At some locations in the block, deposition material is located above support material and at other locations support material is located above the deposition material.

Figure 8:
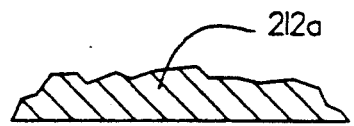
FIGS. 8 through 15 are sectional views showing a preferred sequence of steps used in the fabrication of a portion of the structure of FIG. 3 or alternatively a portion of the structure of FIG. 7.
Figure 9:
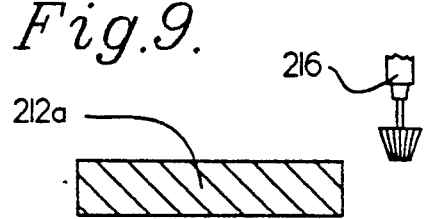
Figure 10:
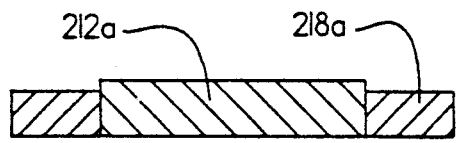
Figure 11:
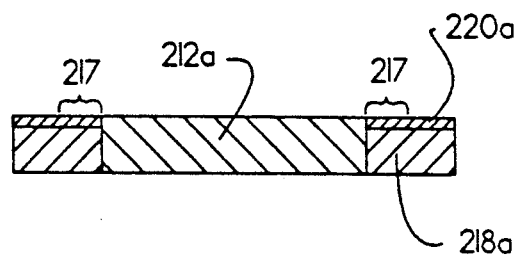
Figure 12:
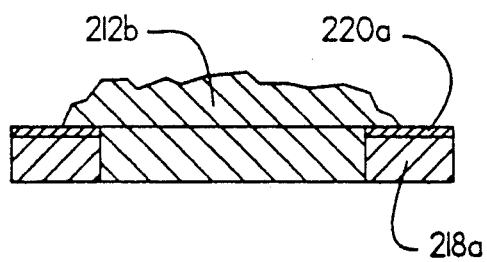
Figure 13:
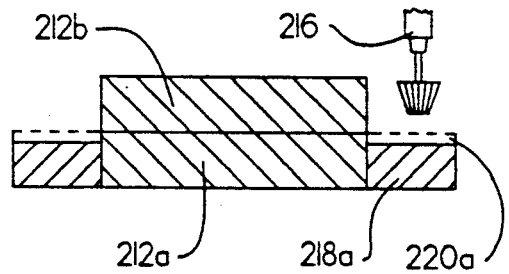
Figure 14:
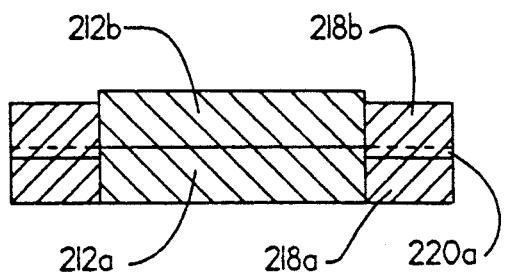
Figure 15:
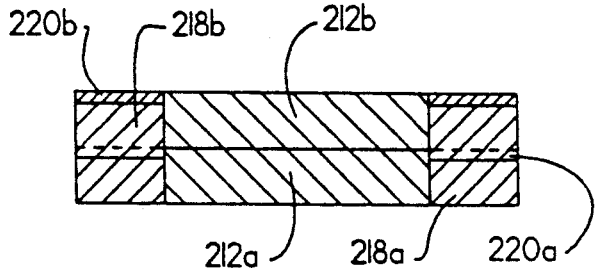

Referring next to FIGS. 8 through 15, in a first preferred sequence of steps, a portion of a structure, such as shown in FIG. 3, is shown being fabricated in n number of layers. As seen in FIG. 8, a first layer of deposition material 212a is placed in the working area. The deposition material is preferably applied by weld deposition, however, any convenient means can be employed. Referring to FIG. 9, the deposition material layer 212a is then shaped by any suitable material forming means, such as milling, grinding, contouring, sanding, smoothing, edging, drilling and polishing and preferably by a grinding wheel 216. Grinding wheel 216 shapes the deposition material layer 212a to the desired contours for the finished object. This shaping can occur immediately after application of the material or can be delayed. A first layer of first support material 218a of the support structure 214 is then placed at the appropriate location upon or adjacent to the deposition material layer 212a, as shown in FIG. 10. A first coating of a support structure second material 220a is then placed upon the support structure first material layer 218a, as shown in FIG. 11. The layers of support structure materials can be applied by any convenient means such as by thermal spray deposition, liquid slurry or gravity feed device such as a hand sifter, or preferably by weld deposition. In addition, the masks which may be used in the deposition process may be replaced on the support structure layer as the support structure second material. The second support structure material could also be applied by plating. A next layer of deposition material 212b is then placed at the appropriate location upon the previous layer of deposition material layer 212a and when necessary upon the coating of support structure second material 220a, as can be seen in FIG. 12. Next, as shown in FIG. 13, the coating of second material 220a is then removed and the deposition material 212b is shaped by any suitable means, such as by grinding wheel 216. Since the support structure second material 220a has been removed, the next layer of support structure first material 218b is placed at the appropriate location upon the preceding layer of support structure first material 218a as shown in FIG. 14. For some shapes this layer may overlap the first layer of deposition material. As shown in FIG. 15, a next coating of the support structure second material 220b is then placed upon the most recently applied layer of support structure first material 218b. The coatings of support structure second material are removed by any convenient means. The aforementioned steps are then repeated until a sufficient number of layers are deposited to form a block of materials, such as is shown in FIG. 3. In the proceeding steps, for any given layer, the support structure material may be applied first followed by the application of the deposition material.

Referring again to FIGS. 8 through 15, a second preferred sequence of steps for fabricating a structure, some of or all of the layers of support structure second material 220a through 220n are left remaining and are not machined away. This alternative sequence of steps is otherwise identical to the sequence of the first preferred sequence of steps. Thus, in this method, a first layer of deposition material 212a is placed in the working area as shown in FIG. 8, and shaped as seen in FIG. 9. A first layer of support structure first material 218a is applied as shown in FIG. 10, and a first coating of support structure second material 220a is then placed upon the layer support structure first material 218a, as shown in FIG. 11. Referring to FIG. 12, a next layer of deposition material 212b is placed upon the previous layer of deposition material 212a and the coating of support structure second material 220a, and is shaped, as shown in FIG. 13. The coating of support structure second material 220 remains as shown by dotted lines in FIGS. 13 through 15. A next layer of support structure first material 218b is then placed upon the existing layer of support structure 218a and 220a, as shown in FIG. 14, followed by a next coating of support structure second material 220b, shown in FIG. 15. The aforementioned steps are repeated until a block of materials such as is shown in FIG. 7 is formed.

In another alternative embodiment, the support structure second material is machined away at an area adjacent to the fabricated object while the layers are being formed. In FIG. 11, the area of the block in which the support structure second material is removed is indicated by brackets 217. The support structure second material may be removed from area 217 during the step in which the deposition material is shaped, and may be removed by any convenient means.

Although the coatings of support structure second material 220a through 220n are shown in the figures as extending across the entire layer, the coatings may alternatively be applied only in the vicinity of the next application of the deposition material.

Figure 16:
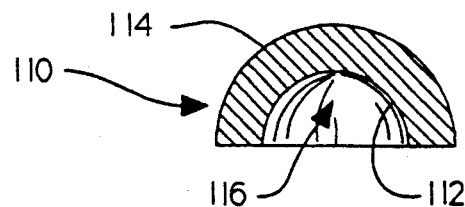
FIG. 16 is a longitudinal sectional view of another article to be created.
Figure 17:
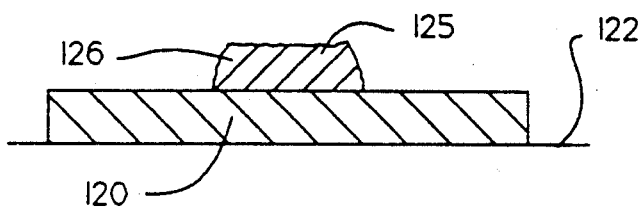
FIG. 17 is a sectional view showing a step of a method for creating the article of FIG. 16 in which support structure material is applied to a substrate.
Figure 18:
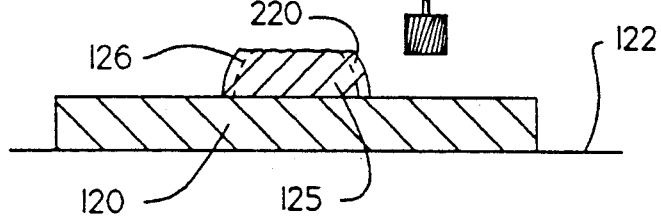
FIG. 18 is a sectional view of another step of the method in which the support structure material is shaped.
Figure 19:
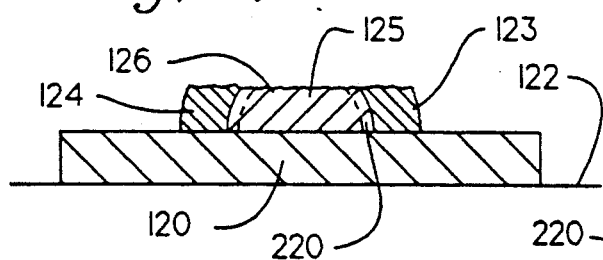
FIG. 19 is a sectional view of yet another step of the method in which a deposition material is applied around the shaped support structure material.
Figure 20:
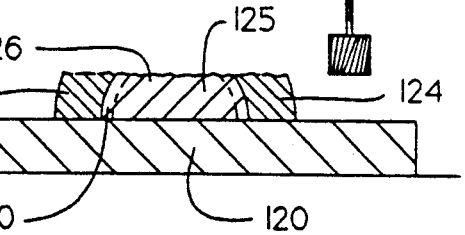
FIG. 20 is a sectional view of yet another step of the method in which the deposition material is shaped.
Figure 21:
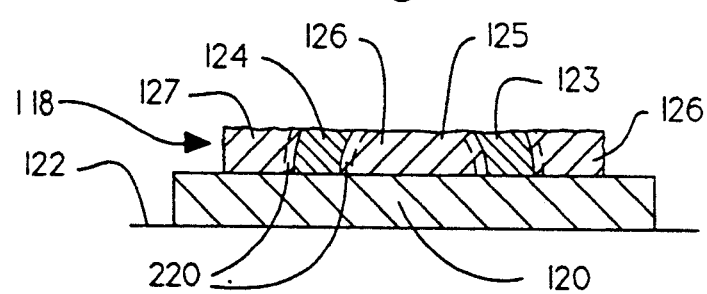
FIG. 21 is a sectional view of yet another step of the method in which complimentary material is applied around the deposition material.
Figure 22:
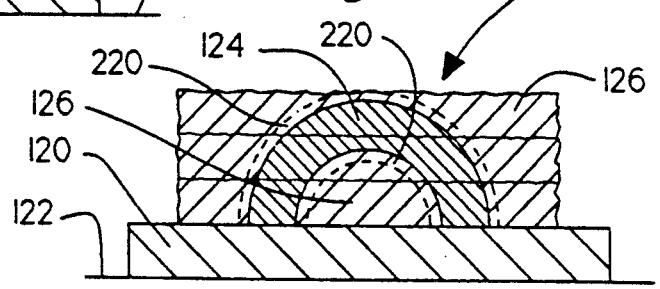
FIG. 22 is a sectional view of yet another step of a method in which several layers have been formed by the preceding steps.

In FIG. 16 we show a hemispherical article 110 which can be manufactured in accordance with a sequence shown in FIGS. 17 through 22. Article 110 has a curved inner surface 112, a curved outer surface 114 and a cavity 116 that is bounded by inner surface 112. Article 110 is formed by applying several layers 118 upon a substrate 120 that is placed upon a work surface 122. The material of which article 110 is fabricated we refer to as the deposition material 124. The material that surrounds and supports article 110 is hereinafter referred to as the support structure materials 126 and 220. Thus, each layer 118 that is formed consists partly of deposition material 124 and the remaining portion of each layer 118 consists of support structure materials 126 and 220.

Substrate 120 is first positioned on work surface 122. A segment 125 of support structure material 126 is applied to substrate 120 by support structure material delivery means 128. A shaping means 130 shapes and contours at least one surface of segment 125 of support structure material 126 so that the segment 125 of support structure material 126 defines a portion of a complement to inner surface 112 of article 110 for that layer. A segment 123 of deposition material 124 is then applied upon at least one of substrate 120 and support structure material 126 by deposition material means 132. Shaping means 130 shapes and contours at least one surface of segment 123 of deposition material 124 so that segment 123 defines the desired surface of article 110 for that layer 118. A segment 127 of support structure material 126 is then applied upon at least one of substrate 120, deposition material 124 and support structure material 126. Shaping means 130 shapes and contours the surface of segment 127 of support structure material 126 as needed so that shaped segment 127 defines a portion of a complement to the surface of article 110 for layer 118. A coating of a second support structure material 220 shown in dotted lines may also be applied for each layer. Thus, a layer 118 is formed that consists of a segment 123 of deposition material 124 surrounded by two segments 123 and 127 of support structure materials 126 and 220. Subsequent layers 118 are applied similarly, with the exception that segment 123 of deposition material 124 is applied to at least one of substrate 120, support structure material 126 and deposition material 124. Upon completion of the process, a block 134 of support structure material 126 and deposition material 124 is produced. The support structure materials 126 and 220 are then removed from block 134 leaving the deposition material 124 in the shape of article 110. Because at least a portion of each layer was shaped as it was created, the article 110 should be in or very close to its desired shape. If desired, only the first support material 126 can be removed leaving a coating of second support material 220 on the article. That coating of second support material could serve as a protective layer for shipping or remain on the finished product during use.

In the above described process of fabricating article 110, one segment of deposition material 124 and two segments of support structure materials 126 and 220 are formed on layer 118. Two segments of support structure materials 126 and 220 are needed for this layer because one segment contacts and defines inner surface 112 of article 110 and the other segment of support structure materials 126 and 220 contacts and defines outer surface 114. Thus, for each cross-sectional layer 118 that is formed, a segment 127 of support structure materials 126 and 220 surrounds the outer surface 114 of article 110, and an additional segment of support structure material will be applied for each cavity or passageway through a given layer 118. Additionally, if a given cross-sectional layer 118 requires more than one section of deposition material and these sections are not connected, then a segment of deposition material will be applied for each such section.

The effect of shaping the support structure material is that much less, and in some instances no further machining of the finished object is necessary once the process is complete. The deposition material can also be shaped after it has been applied. This will enable objects having curved outer surfaces to be more easily produced. Because the interface between the support structure material and deposition material may change direction from one layer to the next, it is understood that it may be preferable to shape the deposition material for one layer and to shape the support structure material for the next layer.

Any of the described methods of fabricating an object can be used to produce an article of any size and configuration. For example, the article of FIG. 1 could also be made using the sequences for making support structures of FIGS. 8 through 15 and FIGS. 17 through 22.

While we have described certain preferred embodiments of our apparatus and method, it should be distinctly understood that our invention is not limited thereto, but may be variously embodied with the scope of the following claims.

We claim:

1. A support structure for use in the manufacture of three-dimensional objects formed from a deposition material by incremental build-up of layers of deposition material layers and adjacent support structure layers, the support structure comprised of a plurality of layers, each support structure layer having at least one article face shaped such that a combination of all article faces defines an object to be manufactured, at least one of the support structure layers comprising:
   (a) a first material; and
   (b) a coating of a second material placed upon the first material in a manner so that at least a portion of the coating is adjacent to an article face wherein the deposition, material first material and the second material are selected to permit the manufacture of the three-dimensional objects by incremental build-up of layers of deposition material and the support structure and at least a portion of the support structure is removable from a manufactured three-dimensional object.

2. The support structure of claim 1 wherein each of the deposition material layers, the first material and the second material respectively have a deposition material melting point, a first material melting point and a second material melting point, wherein the first material melting point is lower than the deposition material melting point.

3. The support structure of claim 2 wherein the second material melting point is greater than the first material melting point.

4. The support structure of claim 1 wherein at least a portion of the support structure is removed after the object is completed.

5. The support structure of claim 1 wherein the first material is a ceramic.

6. The support structure of claim 1 wherein the second material is the same material as the deposition material.

7. The support structure of claim 1 wherein the deposition material layers are metal.

8. The support structure of claim 7 wherein the deposition material is applied by weld deposition.

9. The support structure of claim 7 wherein the first material is one of a tin-zinc alloy and a tin-bismuth alloy.

10. The support structure of claim 1 wherein at least one of the first material and the second material is applied by thermal spray deposition.

11. The support structure of claim 1 wherein at least a portion of the second material forms a coating around at least a portion of the manufactured three-dimensional object.

* * * * *